(12) United States Patent
Ottar et al.

(10) Patent No.: US 12,470,490 B2
(45) Date of Patent: Nov. 11, 2025

(54) SELECTING A COMMUNICATION METHOD USING A MANAGEMENT CONTROLLER OF A DATA PROCESSING SYSTEM

(71) Applicant: Dell Products L.P., Round Rock, TX (US)

(72) Inventors: Vinodkumar Vasudev Ottar, McKinney, TX (US); Abeye Teshome, Austin, TX (US); Richard M. Tonry, Georgetown, TX (US); Bassem El-Azzami, Austin, TX (US); Mohit Arora, Frisco, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/649,241

(22) Filed: Apr. 29, 2024

(65) Prior Publication Data

US 2025/0337689 A1    Oct. 30, 2025

(51) Int. Cl.
*H04L 47/24* (2022.01)
*H04L 67/02* (2022.01)

(52) U.S. Cl.
CPC .............. *H04L 47/24* (2013.01); *H04L 67/02* (2013.01)

(58) Field of Classification Search
CPC ................ H04L 47/24; H04L 67/02

USPC ........................................... 709/238
See application file for complete search history.

(56) References Cited

U.S. PATENT DOCUMENTS

| | | |
|---|---|---|
| 8,042,182 B2 | 10/2011 | Milani Comparetti et al. |
| 8,615,785 B2 | 12/2013 | Elrod et al. |
| 8,924,620 B2 | 12/2014 | Harriman et al. |
| 9,215,244 B2 | 12/2015 | Ayyagari et al. |
| 9,734,169 B2 | 8/2017 | Redlich et al. |
| 10,176,308 B2 | 1/2019 | Mintz et al. |
| 10,298,670 B2 | 5/2019 | Ben-Shael et al. |
| 10,630,702 B1 * | 4/2020 | Irwan .................... H04L 9/3239 |
| 10,671,765 B2 | 6/2020 | Swierk et al. |
| 11,036,902 B2 | 6/2021 | Nicholas |
| 11,102,122 B2 | 8/2021 | Seed et al. |
| 11,134,380 B2 | 9/2021 | Fox et al. |

(Continued)

*Primary Examiner* — Joon H Hwang
(74) *Attorney, Agent, or Firm* — WOMBLE BOND DICKINSON (US) LLP

(57) ABSTRACT

Methods and systems for managing operations of a data processing system are disclosed. To manage operations of the data processing system, a management controller of the data processing system may obtain data to be provided to a remote device. The management controller may obtain a characteristic of the data. Based on at least the characteristic and a rule set for determining transmission paths for data, a determination may be made regarding a transmission path for the data. In a first instance of the determination in which the transmission path includes a broker, the data may be provided to the broker via an out-of-band communication channel using a broker communication protocol. In a second instance of the determination in which the transmission path does not include the broker, the data may be provided to the remote device via an out-of-band communication channel using a hypertext transfer protocol (HTTP).

20 Claims, 7 Drawing Sheets

(56) References Cited

U.S. PATENT DOCUMENTS

| | | |
|---|---|---|
| 11,487,274 B2 | 11/2022 | Valder et al. |
| 11,792,267 B2 | 10/2023 | Kreiner et al. |
| 2011/0087387 A1 | 4/2011 | Safa-Bakhsh et al. |
| 2018/0039946 A1 | 2/2018 | Bolte et al. |
| 2021/0034048 A1 | 2/2021 | Hajizadeh |
| 2021/0073211 A1 | 3/2021 | Wright, Sr. |
| 2022/0038659 A1 | 2/2022 | Michel |
| 2024/0259295 A1* | 8/2024 | Adeel .................. H04L 43/067 |

* cited by examiner

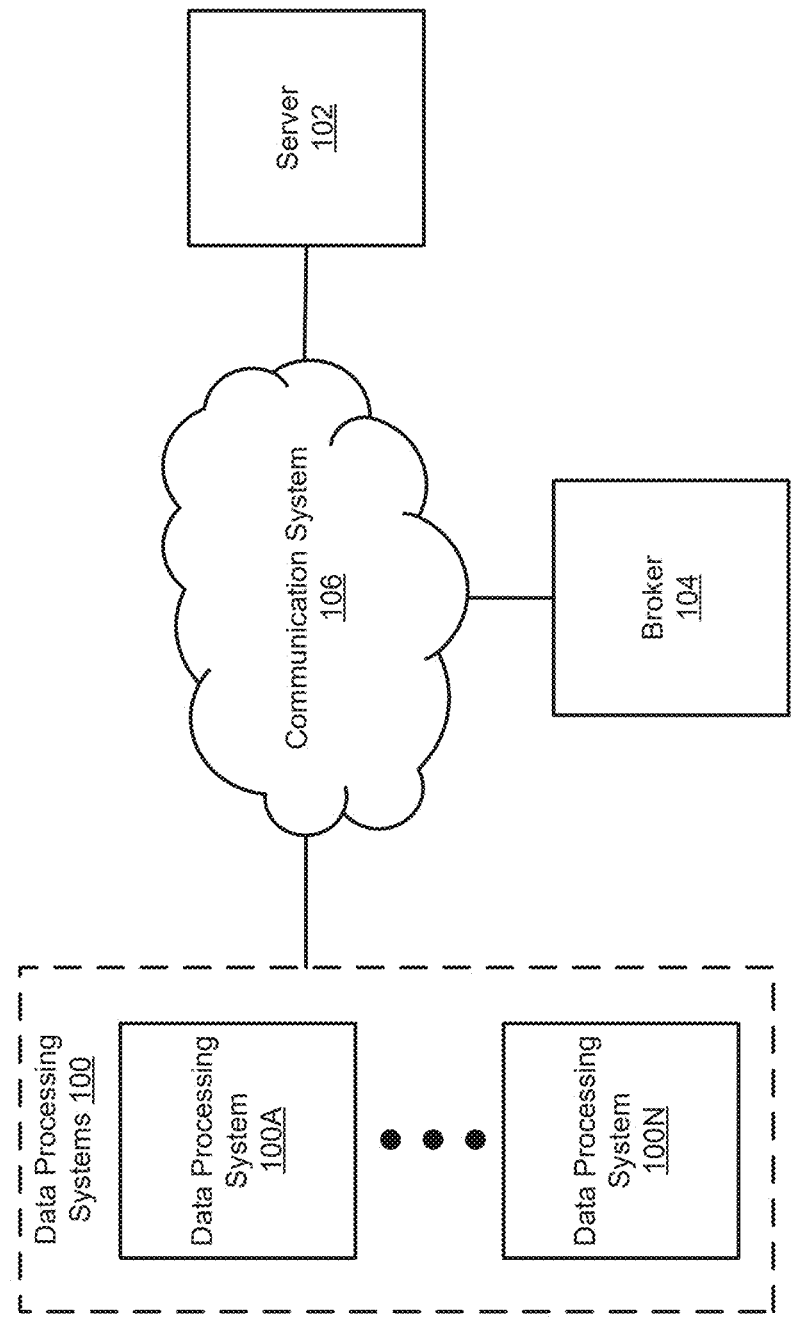

SELECTING A COMMUNICATION METHOD USING A MANAGEMENT CONTROLLER OF A DATA PROCESSING SYSTEM

FIELD

Embodiments disclosed herein relate generally to managing a data processing system. More particularly, embodiments disclosed herein relate to systems and methods for selecting a communication protocol using a management controller of a data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a system in accordance with an embodiment.

DETAILED DESCRIPTION

Figure 1B:
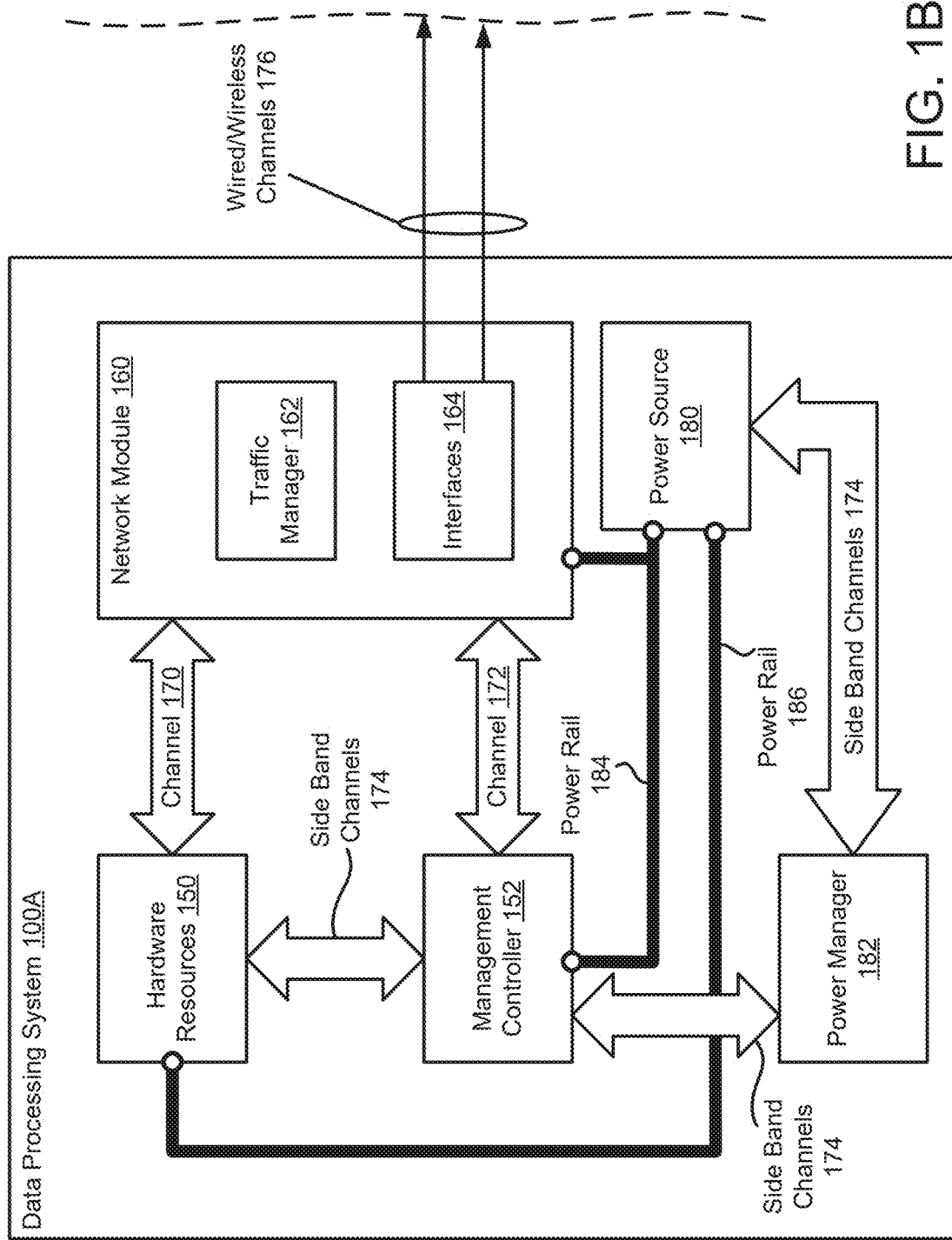
FIG. 1B shows a second block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing communication capabilities of a data processing system. The data processing system may include out-of-band components such as a management controller, which may communicate with a remote device (e.g., a server).

To communicate with the server, the management controller of the data processing system may transmit data via out-of-band communication channels, which may use a corresponding communication protocol. For example, the management controller may transmit the data directly to the server via a direct channel, which may use a hypertext transfer protocol (HTTP) (and/or hypertext transfer protocol secure (HTTPS)). Alternatively, the management controller may transmit data to the server via a broker-based channel. The broker-based channel may use a broker communication protocol (e.g., a message queuing telemetry transport (MQTT) protocol).

Each communication channel and corresponding communication protocol may be best suited for different types of data. For example, transmission via a direct channel and HTTP(S) protocol may be necessary in cases where there is a security requirement for transmitting the data (e.g., the data needs to be transmitted to the server in a secured session) or when there is a synchroneity requirement for processing of the data by the server (e.g., the management controller needs a synchronous response from the server). Transmission via a broker-based channel and broker communication protocol may be necessary to conserve resources (e.g., minimizing bandwidth consumption of the communication channel).

In order to select the best suited communication channel and protocol for transmitting the data, the management controller may obtain a characteristic of the data and a rule set for determining transmission paths for data. The management controller may use the characteristic and rule set for determining transmission paths for data to determine the transmission path (e.g., determine whether the transmission path includes a broker). The management controller may then package the data with metadata indicating the transmission path, and provide the data to a network module of the data processing system. The network module may then transmit the data through the appropriate transmission path.

Thus, embodiments disclosed herein may address, among other technical problems, the technical challenge of providing data to a remote device via an out-of-band communication channel and communication protocol selected based on a characteristic of the data. By determining the transmission path for the data based on a characteristic of the data, the management controller may increase the likelihood of the data being transmitted through the transmission path which optimizes resources (e.g., bandwidth) while meeting data requirements (e.g., security requirements, synchroneity requirements).

In an embodiment, a method for managing operation of a data processing system is disclosed. The method may include: obtaining, by a management controller of the data processing system, data to be provided to a remote device; obtaining, by the management controller, a characteristic of the data; making a determination, based on at least the characteristic and a rule set for determining transmission paths for data, regarding a transmission path for the data; in a first instance of the determination in which the transmission path comprises a broker: providing, via an out-of-band communication channel, the data to the broker using a broker communication protocol; and in a second instance of the determination in which the transmission path does not comprise the broker: providing, via the out-of-band communication channel, the data to the remote device using a hypertext transfer protocol (HTTP).

The data processing system may include a network module adapted to separately advertise network endpoints for the management controller and hardware resources of the data processing system, the network endpoints being usable by the remote device to address communications to the hardware resources using an in-band communication channel and the management controller using the out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

The management controller may host a TCP/IP stack to facilitate network communications via the out-of-band communication channel.

The rule set for determining transmission paths for data may include rules keyed to characteristics of the data.

The characteristic of the data may include at least one characteristic selected from a group consisting of: bandwidth of the out-of-band communication channel required to provide the data to the remote device; a synchroneity requirement between the data and processing of the data by the remote device; and a security requirement between the data processing system and the remote device.

Providing the data to the broker using a broker communication protocol may include providing the data to the remote device via the broker.

The broker may be an intermediary entity which may facilitate communication between any number of management controllers and any number of remote devices which are registered with the broker.

Making the determination may include identifying that the broker communication protocol is non-functional and providing the data to the remote device using the HTTP protocol.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services. The computer-implemented services may include any type and quantity of services including, for example, data services (e.g., data storage, access and/or control services), communication services (e.g., instant messaging services, video-conferencing services), and/or any other type of service that may be implemented with a computing device. The computer-implemented services may be provided by, for example, data processing systems 100, server 102, broker 104 and/or any other type of devices (not shown in FIG. 1A). Other types of computer-implemented services may be provided by the system shown in FIG. 1A without departing from embodiments disclosed herein.

The system may include any number and/or type of data processing systems 100 (e.g., 100A-100N). Data processing systems 100 may include any number of hardware components (e.g., processors, memory modules, storage devices, communications devices). The hardware components may include out-of-band hardware components (e.g., a management controller) that may be used to provide data for the data processing system to a remote device (e.g., server 102). By providing the data to server 102 using out-of-band components, potentially compromised or inoperable hardware resources (e.g., in-band components) may be circumvented, decreasing the likelihood of the data becoming compromised (e.g., unreliable).

In order to communicate with server 102 via out-of-band methods, the management controller of a data processing system (e.g., data processing system 100A) may transmit data to and receive data from server 102 via an out-of-band communication channel. For example, data processing system 100A may communicate with server 102 using a broker-based communication channel. Using the broker-based communication channel may include (i) establishing the broker-based communication channel by registering data processing system 100A with a broker (e.g., broker 104), (ii) transmitting data to broker 104 using the broker-based communication channel and a broker communication protocol (e.g., a message queuing telemetry transport (MQTT) protocol), and/or (iii) transmitting data from broker 104 to remote devices subscribed to data from data processing system 100A (e.g., server 102).

Data processing system 100A may use a broker-based communication channel and broker communication protocol for communicating with server 102 due to advantages such as minimizing data overhead, optimizing network bandwidth, and/or utilizing a publish-subscribe model allows data processing system 100A to efficiently communicate with server 102.

While performing the computer-implemented services, data processing system 100A may experience a security threat (e.g., attempted access of the device by an unauthorized user). After detecting the security threat, data processing system 100A may transmit a security alert to server 102 including information regarding the nature of the threat, and may require an immediate response from server 102 in order to mitigate a security risk (e.g., installation of malware on the device).

To receive an immediate (e.g., synchronous) response from server 102, data processing system 100A may need to communicate with server 102 using a direct channel and communication protocol (e.g., a hypertext transfer protocol (HTTP), hypertext transfer protocol secure (HTTPS)). However, data processing system 100A may only have the capabilities to communicate with server 102 via broker-based methods, resulting in a time delay before receiving a response from server 102.

Because of the time delay, data processing system 100A may be unable to appropriately manage the security threat, resulting in a security breach which may include (i) installation of malware onto the data processing system, (ii) access to sensitive data on the data processing system obtained by an unauthorized user, and/or (iii) other security breaches. As a result of the security breach, data processing system 100A may become compromised and unable to provide any and/or a portion of the computer-implemented services.

In general, embodiments disclosed herein may provide methods, systems, and/or devices for managing out-of-band communication capabilities of a data processing system. The data processing system may include out-of-band components that may be used to communicate with a remote device (e.g., a server), refer to FIG. 1B. To manage the out-of-band communication capabilities of a data processing system, the system may establish two out-of-band communication channels. The out-of-band communication channels may include a direct channel to the server, which may use an HTTP and/or HTTPS protocol, and a broker-based channel, which may use a broker communication protocol (e.g., an MQTT protocol).

To communicate with the server via out-of-band methods, a management controller of the data processing system may obtain data to be provided to the server. The management controller may determine which out-of-band communication channel to use to transmit the data to the server by obtaining a characteristic of the data. Based on the characteristic, the management controller may determine a transmission path for the data (e.g., a direct path to the server, a path including the broker). The management controller may package the data with metadata including information regarding the transmission path and provide the data to a network module. The network module may then transmit the data through the out-of-band communication channel indicated by the metadata.

By doing so, a system in accordance with an embodiment may increase the likelihood of the data processing system selecting a communication channel (e.g., direct, broker-based) and corresponding protocol (e.g., HTTP, MQTT) which is best suited for the type and requirements of the data that is to be transmitted to the server. By selecting a protocol based on the data, the system may conserve resources (e.g., by choosing a protocol with lower overhead), reduce bandwidth consumption, meet security requirements, and ensure a response is received from the server within a necessary time frame (e.g., a synchronous response).

To perform the above-mentioned functionality, the system of FIG. 1A may include data processing systems 100, server 102, and/or broker 104. Data processing systems 100, server 102, broker 104, and/or any other type of devices not shown in FIG. 1A may perform all, or a portion of the computer-implemented services independently and/or cooperatively. Each of these components is discussed below.

Data processing systems 100 may include any number and/or type of data processing systems (e.g., 100A-100N). Data processing systems 100 may include out-of-band components (e.g., a management controller) and functionality that may allow data exchange between the out-of-band components independently from in-band components (e.g., hardware resources) of data processing systems 100. For more information regarding out-of-band components of data processing systems 100, refer to the discussion of FIG. 1B.

The management controller of a data processing system (e.g., data processing system 100A) may communicate with a device (e.g., a server, a broker) via out-of-band communication channels. The management controller may (i) provide data to the device via out-of-band communication channels, (ii) obtain data (e.g., computing instructions) from the device via out-of-band communication channels, (iii) facilitate updating of the operation of data processing system 100A (e.g., based on the computing instructions), and/or (iv) perform other actions related to providing computer-implemented services.

Data processing system 100A (e.g., the management controller) may provide data to a device upon request (e.g., by the device) and/or automatically. For example, data processing system 100A may provide data automatically (e.g., to registered devices) based on a schedule, and/or upon (automatic) detection of a change (e.g., above a threshold). Data processing system 100A may provide data, for example, to server 102, which may participate in managing operation of data processing system 100A.

Server 102 may include any number and/or type of remote devices (e.g., other data processing systems, management systems, storage devices, user devices) that may provide computer-implemented services (e.g., location-based services, security related services, device managing services). To perform its functionality, server 102 may (i) obtain data (e.g., via out-of-band communication channels from the management controller of data processing system 100A, via a broker), (ii) monitor, manage and/or store data (e.g., in a repository, not shown), (iii) obtain requests from data processing system 100A (e.g., from the management controller, from the broker), (iv) provide responses to requests to data processing system 100A (e.g., provide the responses to the management controller, provide the responses to the broker) and/or (v) perform other tasks associated with managing the operation of data processing systems.

To provide data to server 102, data processing system 100A may communicate with the server directly or through the broker (e.g., broker 104). Broker 104 may include any number and/or type of brokers (e.g., other data processing systems, management systems, storage devices, user devices) that may provide communication management services. To perform its functionality, broker 104 may (i) establish clients (e.g., data processing systems 100, server 102), (ii) obtain messages from clients (e.g., data from the management controller, data from server 102), (iii) identify clients subscribed to the messages, (iii) provide the messages to the clients subscribed to the messages, and/or (iv) perform other tasks associated with managing communications between systems.

Thus, out-of-band communications between data processing system 100A and server 102 may be transmitted directly, and/or may be transmitted via broker 104. By enabling data processing system 100A to communicate with server 102 via multiple transmission pathways, the management controller may select the transmission pathway that is best suited for the data being transmitted. By doing so, the management controller may obtain an immediate response from server 102 when necessary, which may result in the computer-implemented services provided by data processing system 100A being less likely to be delayed, interrupted, or compromised.

Figure 3:
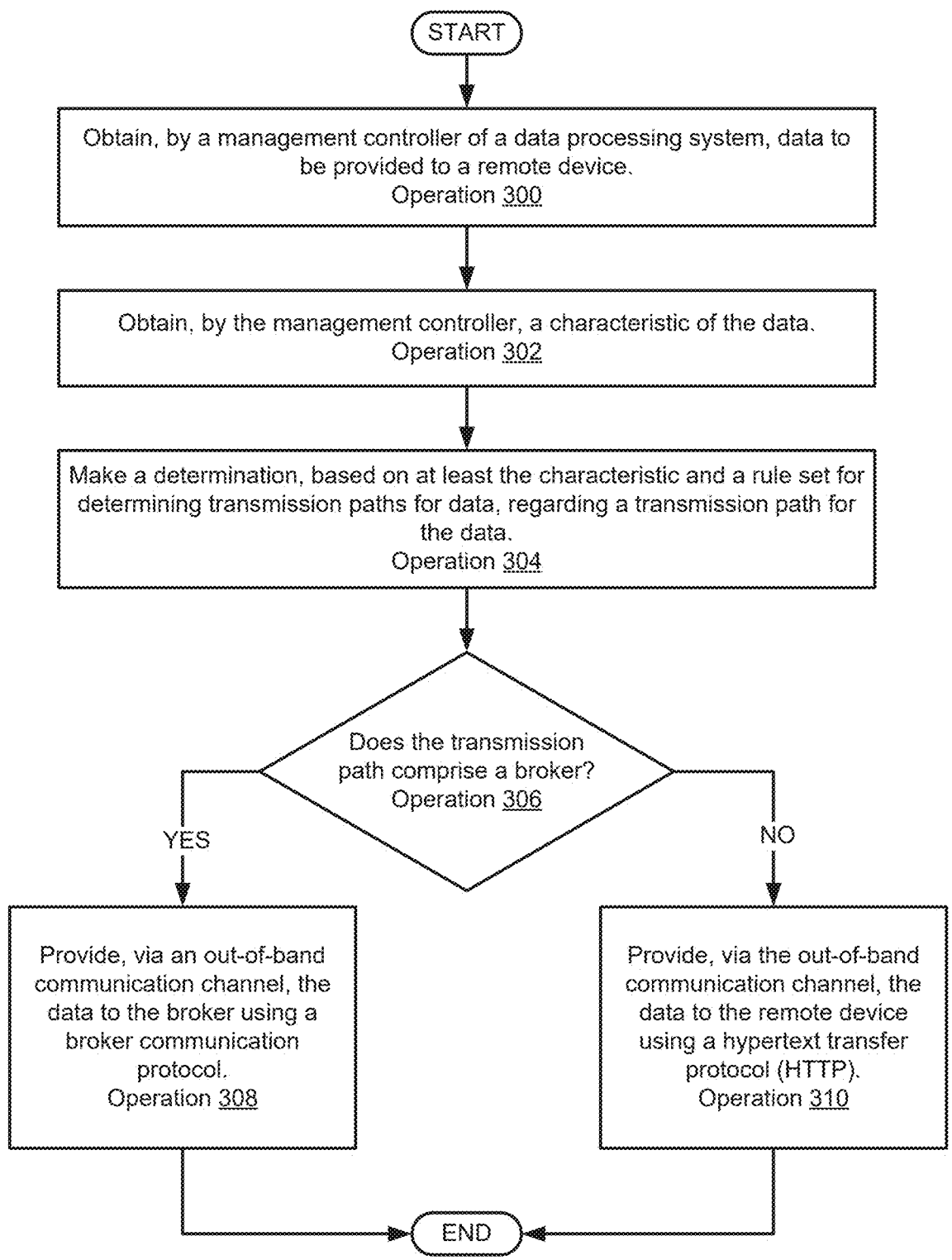
FIG. 3 shows a flow diagram illustrating a method of managing a data processing system in accordance with an embodiment.

When providing their functionality, any of data processing systems 100, server 102, and/or broker 104 may perform all, or a portion of the methods shown in FIG. 3.

Any of (and/or components thereof) data processing systems 100, server 102, and/or broker 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to FIG. 4.

In an embodiment, one or more of data processing systems 100, server 102, and/or broker 104 are implemented using an internet of things (IoT) device, which may include a computing device. The IoT device may operate in accordance with a communication model and/or management model known to data processing systems 100, server 102, broker 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single server (e.g., 102), it will be appreciated that the system may include any number of servers.

Turning to FIG. 1B, a diagram illustrating a data processing system in accordance with an embodiment is shown. The data processing system (e.g., data processing system 100A) shown in FIG. 1B may be similar to any of the computing devices (e.g., data processing systems 100) shown in FIG. 1A.

To provide computer-implemented services, data processing system 100A may include any quantity of hardware resources 150. Hardware resources 150 may be in-band hardware components, and may include a processor operably coupled to memory, storage, and/or other hardware components. Hardware resources 150 may (e.g., via the processor) provide the computer-implemented services desired by users of data processing system 100A.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100A) to another device via any number of intermediate networks (e.g., via wired/wireless channels 176 that are part of the networks).

In addition, different configurations of hardware resources 150 and/or software resources may be implemented by data processing system 100A based on the type of computer-implemented services that are to be provided. Modifications to configurations of hardware resources 150 and/or the software resources may lead to downtime for data processing system 100A and may consume network bandwidth of channel 170.

To reduce the downtime of data processing system 100A and to reduce the likelihood of the applications and/or other in-band entities from being indirectly compromised, data processing system 100 may include management controller 152 and network module 160. Each of these components of data processing system 100A is discussed below.

Management controller 152 may operate independently from hardware resources 150 and, therefore, hardware resources 150 may not host and/or manage operation of management controller 152. In addition, management controller 152 may be distinct from hardware resources 150 and, therefore, may be physically separate from hardware resources 150. Management controller 152 may also be operably connected to communication components of data processing system 100A via separate channels (e.g., 172) from the in-band components.

Management controller 152 may be implemented, for example, using a system on a chip or other type of independently operating computing device (e.g., independent from the in-band components, such as hardware resources 150, of a host data processing system 100A). Management controller 152 may provide various management functionalities for data processing system 100A. For example, management controller 152 may monitor various ongoing processes performed by the in-band components, may manage power distribution, thermal management, and/or other functions of data processing system 100A.

To do so, management controller 152 may be operably connected to various components via side band channels 174 (in FIG. 1B, a limited number of side band channels are included for illustrative purposes, it will be appreciated that management controller 152 may communicate with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 152 may include, for example, instructions for implementation of computer-implemented services desired by users of data processing system 100A.

To facilitate communication with other devices, data processing system 100A may include network module 160. Network module 160 may provide communication services for in-band components and out-of-band components (e.g., management controller 152) of data processing system 100A.

To provide the above-described functionalities, network module 160 may include traffic manager 162, interfaces 164, and may host an instance of a TCP/IP stack to facilitate communication with other devices independently of any of the in-band components (e.g., does not rely on any hosted software, hardware components, etc.). Accordingly, compromise of any of hardware resources 150 and hosted component may not result in indirect compromise of network module 160, management controller 152, and entities hosted by management controller 152.

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100A may include network module 160. Network module 160 may provide communication services for in-band components and out-of-band components (e.g., management controller 152) of data processing system 100A. Specifically, an out-of-band communication channel (e.g., 172) that services management controller 152 and an in-band communication channel (e.g., 170) that services hardware resources 150 may run through network module 160. Network module 160 may host a TCP/IP stack to facilitate network communications via the out-of-band communication channel. To do so, network module 160 may include traffic manager 162 and interfaces 164.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in-band components and out-of-band components of data processing system 100A may appear to be two independent network entities, which may be independently addressable, and otherwise unrelated to one another.

Network module 160 may utilize the instance of the TCP/IP stack to allow hardware resources 150 and/or management controller 152 to communicate with other devices via packet switched networks and/or other types of communication networks.

To facilitate management of data processing system 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
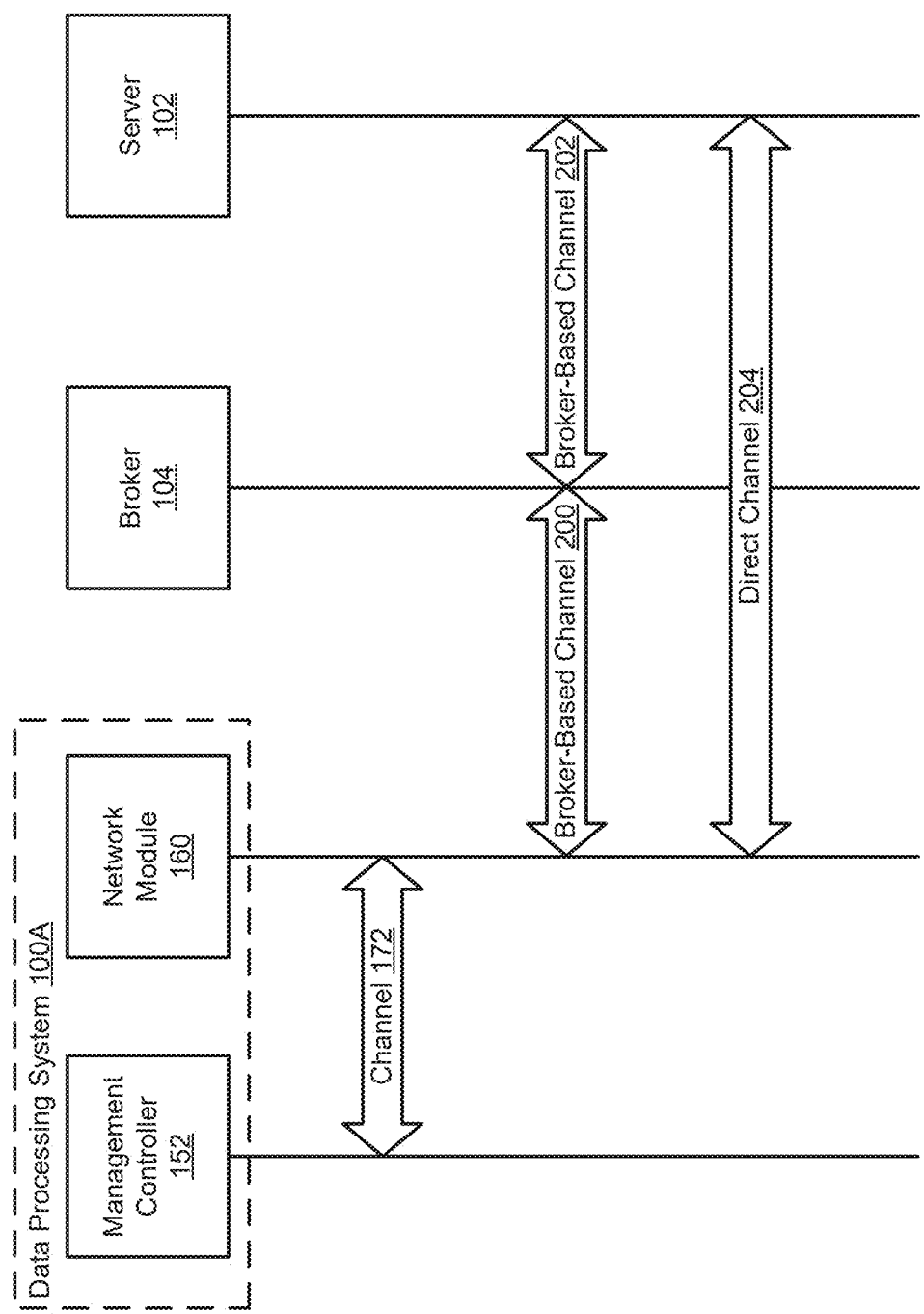
FIGS. 2A-2C show interaction diagrams in accordance with an embodiment.
Figure 2B:
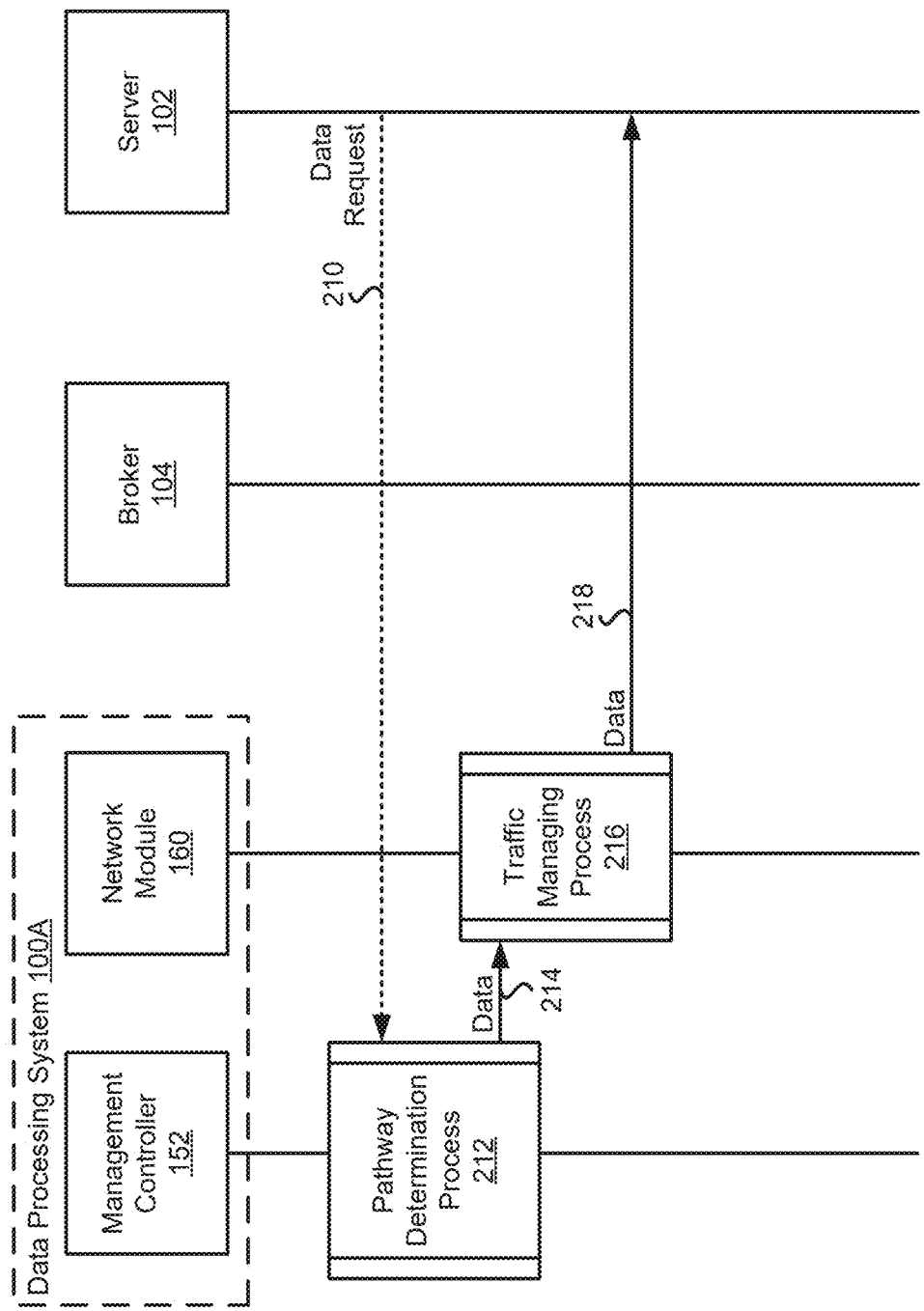
Figure 2C:
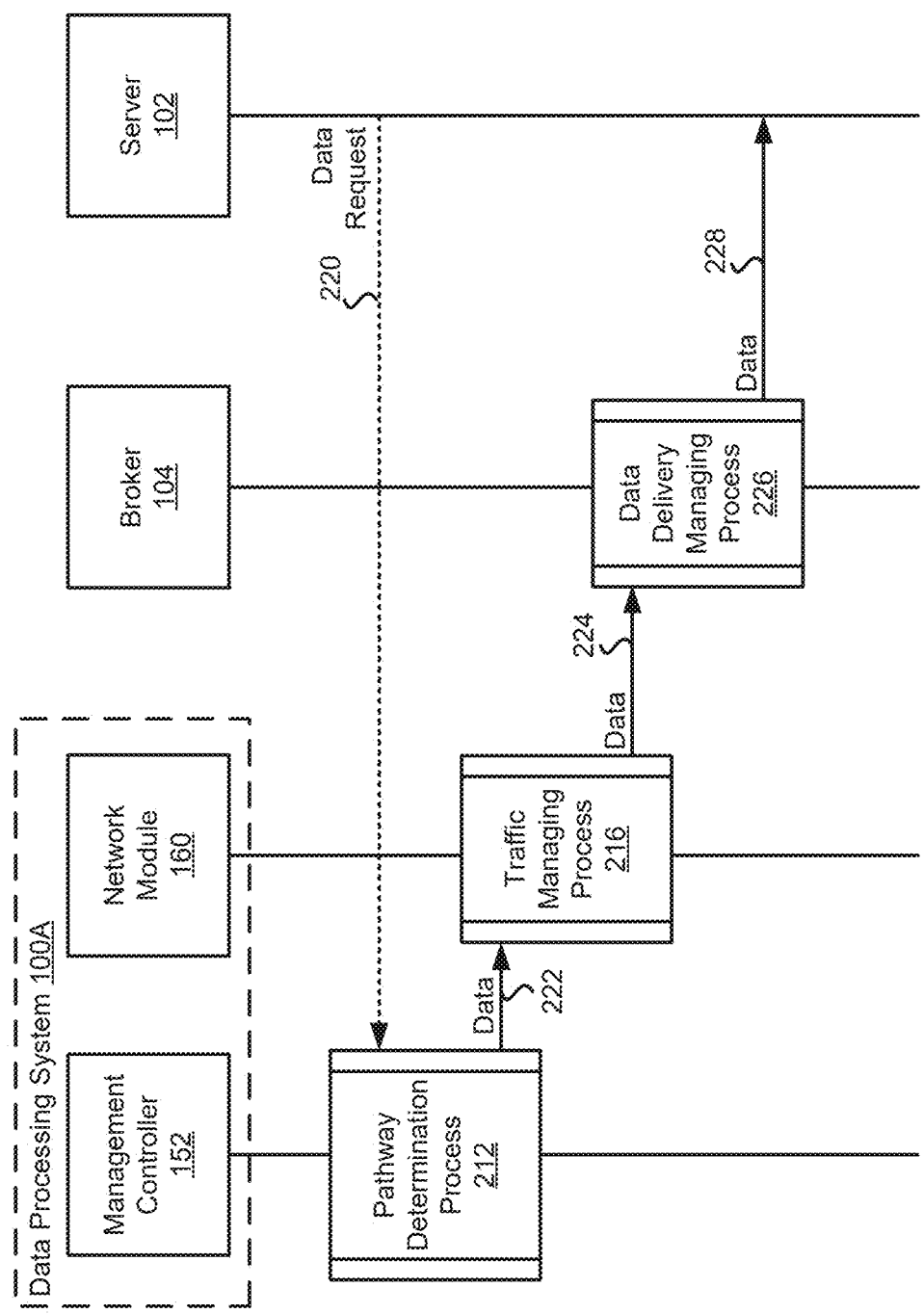

When providing its functionality, management controller 152 may perform all, or a portion, of the methods and operations described in FIGS. 2A-2C.

While illustrated in FIG. 1B with a limited number of specific components, a system may include additional, fewer, and/or different components without departing from embodiments disclosed herein.

To further clarify embodiments disclosed herein, interaction diagrams in accordance with an embodiment are shown in FIGS. 2A-2C. The interaction diagrams may illustrate examples of how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 152, 160, etc.), located towards the top of each figure. Lines descend from these shapes. Processes performed by the components of the system are illustrated using a second set of shapes (e.g., 212, 216, etc.) superimposed over these lines.

Interactions (e.g., communication, data transmissions, etc.) between the components of the system are illustrated using a third set of shapes (e.g., 210, 214, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Some of the lines terminating in one or two arrows (e.g., 210, 220, etc.) are drawn in dashing to indicate, for example, that the corresponding interaction may or may not occur. For example, a request for data may not be necessary in a publish-subscribe system where one component subscribes to updates from another component thereby causing a copy of the data to be propagated to the component without an explicit request.

Generally, the processes and interactions are temporally ordered in an example order, with time increasing from the top to the bottom of each page. For example, the interaction labeled as 210 may occur prior to the interaction labeled as 214. However, it will be appreciated that the processes and interactions may be performed in different orders, any may be omitted, and other processes or interactions may be performed without departing from embodiments disclosed herein.

The processes shown in FIGS. 2A-2C may be performed by any entity shown in the systems of FIGS. 1A-1B (e.g., a device similar data processing system 100A, a server similar to server 102, etc.) and/or another entity without departing from embodiments disclosed herein.

Turning to FIG. 2A, a first interaction diagram in accordance with an embodiment is shown. The first interaction diagram may illustrate out-of-band communication channels which may be used by data processing system 100A to communicate with server 102.

Management controller 152 may obtain data to be provided to server 102 (e.g., from hardware resources 150 and via side band channels 174, not shown). To provide the data to server 102 via an out-of-band communication channel, management controller 152 may obtain a characteristic of the data. The characteristic of the data may include (i) bandwidth of the out-of-band communication channel required to provide the data to server 102, (ii) a synchroneity requirement between the data and processing of the data by server 102, (iii) a security requirement between the data processing system and server 102, and/or (iv) other characteristics.

Management controller 152 may obtain a rule set for determining transmission paths for data. The rule set for determining transmission paths for data may include rules keyed to characteristics of the data. Management controller 152 may use the rule set for determining transmission paths for data and the characteristic of the data to make a determination regarding a transmission path for the data.

After determining a transmission path for the data, management controller 152 may package the data with metadata indicating the transmission path (e.g., packaged data). The packaged data may be provided to network module 160 via out-of-band channel 172.

Network module 160 may use the metadata to determine whether the transmission path for the packaged data to be provided to server 102 includes a broker. If it is determined that the transmission path includes a broker, network module 160 may provide the packaged data to broker 104 via broker-based channel 200. Broker 104 may then provide the packaged data to server 102 via broker-based channel 202. If it is determined that the transmission path does not include a broker, network module 160 may provide the packaged data directly to server 102 via direct channel 204. Management controller 152 may provide the packaged data to server 102 via the out-of-band communication channels without departing from embodiments disclosed herein (e.g., using a TCP/IP stack hosted by management controller 152 without requiring the packaged data to pass through network module 160).

Thus, as shown in FIG. 2A, a data processing system may use out-of-band communication channels to transmit data to a remote device (e.g., a server). A management controller of the data processing system may use a characteristic of the data to determine whether the data is to be transmitted to the server directly or via a broker. By doing so, the management controller may increase the likelihood of the data being transmitted through the communication channel which optimizes resources (e.g., bandwidth) while meeting data requirements (e.g., security requirements, synchroneity requirements).

Turning to FIG. 2B, a second interaction diagram in accordance with an embodiment is shown. The second interaction diagram may illustrate processes and interactions that may be used to transmit data from a data processing system to a remote device (e.g., a server) via direct channel 204. Refer to FIG. 2C for an example interaction where the data is transmitted indirectly.

To transmit data, management controller 152 of data processing system 100A may obtain data to be provided to server 102 (e.g., from hardware resources 150, not shown). Management controller 152 may obtain the data following a request from server 102 (e.g., data request 210) and/or management controller 152 may obtain the data without a request (e.g., server 102 is subscribed to automatic updates).

For example, management controller 152 may obtain temperature data from a sensor measuring the temperature of data processing system 100A. Management controller 152 may transmit the temperature data to server 102 in order for server 102 to provide thermal management services.

Once obtained, management controller 152 may perform pathway determination process 212. To perform pathway determination process 212, management controller 152 may obtain a characteristic of the data to be provided to server 102 and use the characteristic of the data and a rule set for determining transmission paths for data to determine the transmission path. Refer to FIG. 2A for additional details regarding the characteristic of the data and the rule set for determining transmission paths for data.

Continuing with the above example, management controller 152 may obtain temperature data from the sensor indicating the temperature of data processing system 100A is too high, which may lead to damages resulting in system failure. Management controller 152 may identify a synchroneity requirement between providing the temperature data to server 102 and processing of the temperature data by server 102 (e.g., the characteristic of the data). For example, management controller 152 may identify that a synchronous response (e.g., or a response that is more synchronous, such as having a lower latency between when the data is generated and when a corresponding response is performed) from server 102 including instructions for updating operation of data processing system 100A to lower the temperature is required.

Based on the characteristic of the data (e.g., the synchroneity requirement) and the rule set for determining transmission paths for data, management controller 152 may determine the transmission path for the temperature data does not include a broker (e.g., is to be transmitted directly to server 102 via direct channel 204). Management controller 152 may package the temperature data to include metadata (e.g., control information for a payload) indicating that the temperature data is to be sent via direct channel 204 and provide the temperature data to network module 160 at interaction 214 (via channel 172, not shown).

Network module 160 may use the data obtained from management controller 152 to perform traffic managing process 216. To perform traffic managing process 216, traffic manager 162 (not shown) of network module 160 may analyze the metadata packaged with the temperature data to determine which communication channel to use to transmit the temperature data to server 102.

After the communication channel is determined (e.g., direct channel 204), network module 160 may transmit the temperature data using a corresponding protocol at interaction 218. If the transmission path does not include a broker, network module 160 may provide the data to server 102 using an HTTP and/or HTTPS protocol. For example, to transmit the temperature data directly to the server via direct channel 204, an HTTP network protocol may be used.

Thus, as shown in FIG. 2B, data obtained by a management controller of a data processing system may be transmitted to a server via direct channel 204 using an HTTP and/or HTTPS network protocol.

Turning to FIG. 2C, a third interaction diagram in accordance with an embodiment is shown. The third interaction diagram may illustrate processes and interactions that may be used to transmit data from a data processing system to a remote device (e.g., a server) via broker-based channel 200 and broker-based channel 202 (e.g., providing the data less directly).

To provide the data via broker-based channel 200, management controller 152 of data processing system 100A may obtain data to be provided to server 102 (e.g., from hardware resources 150, not shown). Management controller 152 may obtain the data following a request from server 102 (e.g., data request 220) and/or management controller 152 may obtain the data without a request (e.g., server 102 is subscribed to automatic updates). For example, management controller 152 may obtain location data indicating a geographical location of data processing system 100A and may transmit the location data to server 102 automatically based on a schedule in order for server 102 to perform location-based services.

Once obtained, management controller 152 may perform pathway determination process 212. Refer to FIG. 2B for additional details regarding pathway determination process 212. Continuing with the above example, management controller 152 may determine the location data requires transmission via a low bandwidth communication channel (e.g., due to the characteristic of the data). Based on the characteristic of the data and the rule set for determining transmission paths for data, management controller 152 may determine the transmission path for the location data includes a broker (e.g., is it to be transmitted to broker 104 via broker-based channel 200). Management controller 152 may package the location data to include metadata indicating that the location data is to be sent via broker-based channel 200 and provide the location data to network module 160 at interaction 222.

Network module 160 may use the location data obtained from management controller 152 to perform traffic managing process 216. Refer to FIG. 2B for additional details regarding traffic managing process 216.

After the communication channel is determined (e.g., broker-based channel 200), network module 160 may transmit the location data using a corresponding protocol at interaction 218. If the transmission path includes the broker (e.g., broker 104), network module 160 may provide the data to broker 104 using a broker communication protocol. For example, to transmit the location data to broker 104 via broker-based channel 200, an MQTT protocol may be used.

Providing the location data to broker 104 using the broker communication protocol (e.g., an MQTT protocol) may include providing the data to server 102 via broker 104. Broker 104 may be an intermediary entity which facilitates communication between any number of management controllers and any number of remote devices which are registered with broker 104.

For example, management controller 152 may be registered with broker 104. Management controller 152 may provide the location data to broker 104 (via network module 160 and broker-based channel 200) at interaction 224. Broker 104 may perform data delivery managing process 226. During data delivery managing process 226, broker 104 may obtain the location data, and provide the location data to other registered devices which are subscribed to data from management controller 152. For example, broker 104 may determine server 102 is subscribed to updates from management controller 152, and may provide the location data to server 102 at interaction 228 via broker-based channel 202.

While performing pathway determination process 212, management controller 152 may determine that the broker communication protocol is non-functional and may provide the data to server 102 using the HTTP protocol. For example, management controller 152 may determine the location data is to be transmitted to the server using the broker communication protocol. However, management controller 152 may determine the data is unable to be transmitted using the broker communication protocol (e.g., broker-based channel 200 may be inoperable) and may transmit the data directly to the server using the HTTP protocol via direct channel 204.

Thus, as shown in FIG. 2C, data obtained by a management controller of a data processing system may be transmitted to a server via a broker using a broker communication protocol (e.g., an MQTT protocol). If the management controller determines the broker communication protocol is non-functional, the data may be transmitted directly to the server via an HTTP protocol. By doing so, a system in accordance with an embodiment may be more likely to maintain communication with the server even if some communication channels become inoperable.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2C may perform various methods to manage the out-of-band communication capabilities of data processing systems. FIG. 3 illustrates a method that may be performed by the components of the system of FIGS. 1A-2C. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system, any component of a data processing system (e.g., a management controller, hardware resources) and/or another device.

Turning to FIG. 3, a flow diagram illustrating a method of managing a data processing system in accordance with an embodiment is shown. The method may be performed, for example, by a data processing system, a server, a broker, a communication system, a management controller of a data processing system, hardware resources of a data processing system, and/or any other entity without departing from embodiments disclosed herein.

At operation 300, a management controller of a data processing system may obtain data to be provided to a remote device. Obtaining the data may include (i) receiving the data from hardware resources of the data processing system, (ii) reading the data from storage, (iii) generating the data, and/or (iv) other methods.

At operation 302, the management controller may obtain a characteristic of the data. To obtain the characteristic of the data, the management controller may quantify various aspects of the data (e.g., size, importance, type, etc.) and/or the communication architectures over which the data may be sent. These quantifications to be obtained may be specified, for example, by policies, regulations, or other criteria that defines how the data will be sent on the basis of these quantifications. The quantifications may be obtained by, for example, (i) determining the bandwidth of the out-of-band communication channel required to provide the data to the remote device, (ii) determining whether the data indicates a synchroneity requirement between the data and processing the data by the remote device, (iii) determining whether the data indicates a security requirement between the data processing system and the remote device, and/or (iv) other methods.

At operation 304, a determination may be made based on at least the characteristic and a rule set for determining transmission paths for data regarding a transmission path for the data. Making the determination may include (i) obtaining a rule set for determining transmission paths for data, (ii) parsing the rule set for determining transmission paths for data to determine which rules apply, (iii) selecting a rule from the rule set for determining transmission paths for data, (iv) identifying that the broker communication protocol is non-functional and providing the data to the remote device using the HTTP protocol (e.g., determining a broker-based channel is inoperable, providing the data to the remote device using a direct channel), and/or (iv) other methods.

Making the determination may result in a transmission path of the transmission paths being selected for transmitting the data. As noted above, different transmission paths may include different entities (e.g., brokers) along each path.

At operation 306, a determination may be made regarding whether the transmission path (e.g., the selected transmission path) includes a broker. For example, the determination may be made by parsing the determination regarding the transmission path to ascertain whether it includes a broker, by analyzing the transmission path (e.g., entities along each path may be known based on network information retained by the network module, the TCP/IP stack, etc.), and/or via other methods.

If it is determined that the transmission path includes a broker (e.g., the determination is "Yes" at operation 306), then the method may proceed to operation 308.

At operation 308, the data may be provided to the broker via an out-of-band communication protocol using a broker communication protocol. Providing the data to the broker using a broker communication protocol may include (i)

registering the data processing system with the broker, (ii) transmitting the data to the broker using a message queuing telemetry transport (MQTT) protocol, (iii) providing the data to the remote device via the broker, and/or (iv) other methods.

Providing the data to the remote device via the broker may include (i) transmitting the data from the data processing system to the broker using a broker-based out-of-band communication channel, (ii) determining the remote device is subscribed to data from the data processing system, (iii) transmitting the data from the broker to the remote device using a broker-based communication channel, and/or (iv) other methods.

The method may end following operation 308.

Returning to operation 306, if it is determined that the transmission path does not include a broker (e.g., the determination is "No" at operation 306), then the method may proceed to operation 310.

At operation 310, the data may be provided to the remote device via the out-of-band communication channel using a hypertext transfer protocol (HTTP). Providing the data to the remote device using an HTTP protocol may include (i) establishing a direct channel with the remote device, (ii) transmitting the data to the remote device via the direct channel using an HTTP protocol, and/or (iii) other methods. In other words, the data may be sent to the remote device without using the broker as an intermediary device, using the information regarding registrations/clients maintained by the broker, etc.

The method may end following operation 310.

Using the methods illustrated in FIG. 3, embodiments disclosed herein may provide systems and methods usable to manage data processing systems to provide data from a data processing system to a remote device via out-of-band communication channels using a protocol selected based on a characteristic of the data.

Figure 4:
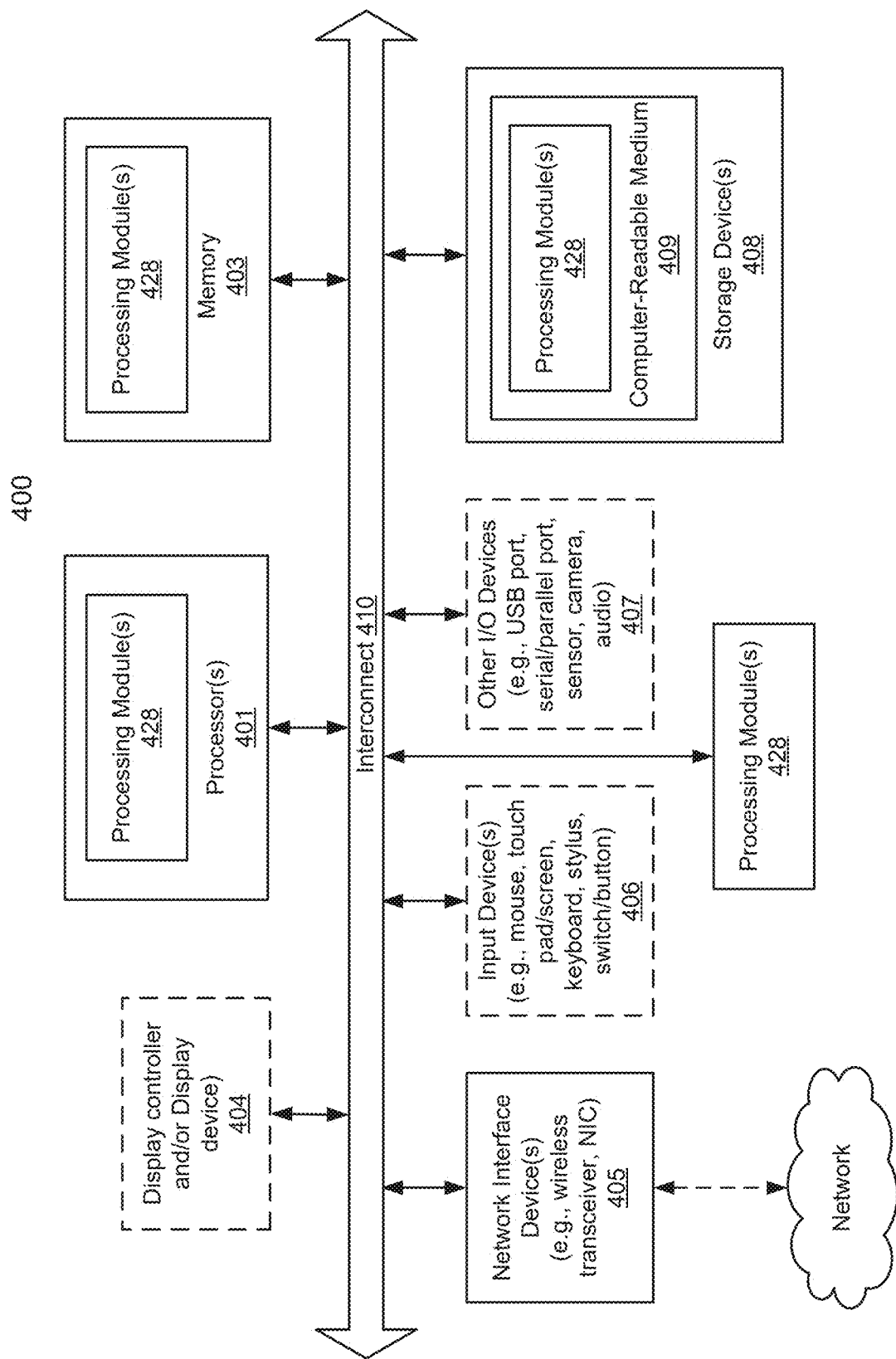
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
    obtaining, by a management controller that is physically installed within the data processing system and that operates as a separate and independent computing device from the data processing system, data to be provided to a remote device, the data processing system comprises a network module adapted to separately advertise network endpoints for the management controller and hardware resources of the data processing system, and the network endpoints are usable by the remote device to address communications to the hardware resources using an in-band communication channel and the management controller using an out-of-band communication channel;
    obtaining, by the management controller, a characteristic of the data;
    making a determination, based on at least the characteristic and a rule set for determining transmission paths for data, regarding a transmission path for the data;
    in a first instance of the determination in which the transmission path comprises a broker:
        providing, via the out-of-band communication channel, the data to the broker using a broker communication protocol; and
    in a second instance of the determination in which the transmission path does not comprise the broker:
        providing, via the out-of-band communication channel, the data to the remote device using a hypertext transfer protocol (HTTP).

2. The method of claim 1, wherein the management controller and the network module are on separate power domains from the hardware resources so that the management controller and the network module are operable while the hardware resources are inoperable.

3. The method of claim 1, wherein the network module hosts a transmission control protocol/internet protocol (TCP/IP) stack to facilitate network communications via the out-of-band communication channel.

4. The method of claim 1, wherein the management controller hosts a transmission control protocol/internet protocol (TCP/IP) stack to facilitate network communications via the out-of-band communication channel.

5. The method of claim 1, wherein the rule set for determining transmission paths for data comprises rules keyed to characteristics of the data.

6. The method of claim 5, wherein the characteristic of the data comprises at least one characteristic selected from a group consisting of:
    bandwidth of the out-of-band communication channel required to provide the data to the remote device;
    a synchroneity requirement between the data and processing of the data by the remote device; and
    a security requirement between the data processing system and the remote device.

7. The method of claim 1, wherein providing the data to the broker using the broker communication protocol comprises providing the data to the remote device via the broker.

8. The method of claim 7, wherein the broker is an intermediary entity which facilitates communication between a plurality of management controllers and a plurality of remote devices which are registered with the broker.

9. The method of claim 1, wherein making the determination comprises identifying that the broker communication protocol is non-functional and providing the data to the remote device using the HTTP protocol.

10. The method of claim 1, wherein the out-of-band communication channel runs through the network module, and the in-band communication channel that services the hardware resources also runs through the network module.

11. A non-transitory machine-readable medium having instructions stored therein, which when executed by a processor, cause the processor to perform operations for managing operation of a data processing system, the operations comprising:
    obtaining, by a management controller that is physically installed within the data processing system and that operates as a separate and independent computing device from the data processing system, data to be provided to a remote device, the data processing system comprises a network module adapted to separately advertise network endpoints for the management controller and hardware resources of the data processing system, and the network endpoints are usable by the remote device to address communications to the hardware resources using an in-band communication channel and the management controller using an out-of-band communication channel;
    obtaining, by the management controller, a characteristic of the data;
    making a determination, based on at least the characteristic and a rule set for determining transmission paths for data, regarding a transmission path for the data;
    in a first instance of the determination in which the transmission path comprises a broker:
        providing, via the out-of-band communication channel, the data to the broker using a broker communication protocol; and
    in a second instance of the determination in which the transmission path does not comprise the broker:
        providing, via the out-of-band communication channel, the data to the remote device using a hypertext transfer protocol (HTTP).

12. The non-transitory machine-readable medium of claim 11, wherein the management controller and the network module are on separate power domains from the hardware resources so that the management controller and the network module are operable while the hardware resources are inoperable.

13. The non-transitory machine-readable medium of claim 11, wherein the out-of-band communication channel runs through the network module, and the in-band communication channel that services the hardware resources also runs through the network module.

14. The non-transitory machine-readable medium of claim 11, wherein the network module hosts a transmission control protocol/internet protocol (TCP/IP) stack to facilitate network communications via the out-of-band communication channel.

15. The non-transitory machine-readable medium of claim 11, wherein making the determination comprises identifying that the broker communication protocol is non-functional and providing the data to the remote device using the HTTP protocols.

16. A data processing system, comprising:
a processor; and
a memory coupled to the processor to store instructions, which when executed by the processor, cause the processor to perform operations for managing operation of a data processing system, the operations comprising:
  obtaining, by a management controller that is physically installed within the data processing system and that operates as a separate and independent computing device from the data processing system, data to be provided to a remote device, the data processing system comprises a network module adapted to separately advertise network endpoints for the management controller and hardware resources of the data processing system, and the network endpoints are usable by the remote device to address communications to the hardware resources using an in-band communication channel and the management controller using an out-of-band communication channel;
  obtaining, by the management controller, a characteristic of the data;
  making a determination, based on at least the characteristic and a rule set for determining transmission paths for data, regarding a transmission path for the data;
  in a first instance of the determination in which the transmission path comprises a broker:
    providing, via the out-of-band communication channel, the data to the broker using a broker communication protocol; and
  in a second instance of the determination in which the transmission path does not comprise the broker:
    providing, via the out-of-band communication channel, the data to the remote device using a hypertext transfer protocol (HTTP).

17. The data processing system of claim 16, wherein the management controller and the network module are on separate power domains from the hardware resources so that the management controller and the network module are operable while the hardware resources are inoperable.

18. The data processing system of claim 16, wherein the out-of-band communication channel runs through the network module, and the in-band communication channel that services the hardware resources also runs through the network module.

19. The data processing system of claim 16, wherein the network module hosts a transmission control protocol/internet protocol (TCP/IP) stack to facilitate network communications via the out-of-band communication channel.

20. The data processing system of claim 16, wherein making the determination comprises identifying that the broker communication protocol is non-functional and providing the data to the remote device using the HTTP protocol.

* * * * *